_United States Patent_ [19]

Schäfer

[11] 4,132,759

[45] Jan. 2, 1979

[54] METHOD OF PURIFYING BRINE USED IN ELECTROLYSIS BY THE AMALGAM PROCESS

[75] Inventor: Rolf Schäfer, Krefeld, Germany

[73] Assignee: Bayer Aktiengesellschaft, Leverkusen, Germany

[21] Appl. No.: 881,992

[22] Filed: Feb. 28, 1978

[30] Foreign Application Priority Data

Mar. 5, 1977 [DE] Fed. Rep. of Germany ....... 2709728

[51] Int. Cl.$^2$ .......................... C01F 11/46; C01C 5/00
[52] U.S. Cl. .................................... 423/161; 423/158; 423/166; 423/170; 423/199; 423/551; 423/552; 423/555; 204/99; 204/128
[58] Field of Search ............... 423/158, 161, 166, 170, 423/199, 551, 552, 555; 204/99, 128

[56] References Cited

U.S. PATENT DOCUMENTS

| 2,248,137 | 7/1941 | Taylor et al. | 204/99 |
| 3,051,637 | 8/1962 | Judice et al. | 204/99 |

_Primary Examiner_—R. L. Andrews
_Attorney, Agent, or Firm_—Sprung, Felfe, Horn, Lynch & Kramer

[57] ABSTRACT

In the process for the production of chlorine and alkali metal hydroxide by electrolysis according to the amalgam process using calcium- and/or sulphate containing crude salt, the calcium and/or sulphate contents introduced into the brine circuit by the crude salt are removed from the brine by precipitation of the double salt $Na_2SO_4 \cdot CaSO_4$. Small particles of glauberite may be introduced to the brine to initiate and accellerate precipitation.

8 Claims, No Drawings

METHOD OF PURIFYING BRINE USED IN ELECTROLYSIS BY THE AMALGAM PROCESS

In the electrolysis of alkali metal chlorides by the amalgam process (Hund, Zirngiebl; Das Chlor und seine anorganischen Verbindungen (Chlorine and its Inorganic Compounds) in: Winnacker-Kuchler, Chemische Technologie, Vol. 1, pages 232–235 and 250–276, Munich, 1969) it is knwon that only a small proportion of the salt is removed from the brine during electrolysis. The brine flowing off from the electrolysis cell, which generally has a salt content of from 260 to 300 g per liter, is strengthened with solid salt to the salt concentration suitable for electrolysis amounting to approximately 300 g per liter, until the saturation concentration is reached and is subsequently subjected to purification, the brine being freed from the impurities introduced by the crude salt, particularly calcium and sulphate contents, which are not removed from the brine during electrolysis.

In cases where graphite anodes are used, an excessive sulphate content in particular results in increased burn-up of the graphite anodes and, hence, shortens their service lives. Relatively high sulphate contents can be tolerated where activated titanium anodes are used. However, in their case, too, sulphate and calcium contents of the order of magnitude of the solubility product of gypsum disrupt the electrolysis plant through the uncontrolled precipitation of gypsum, particularly on account of the temperature fluctuations to which the brine in the brine circuit is subjected.

In the classic process for adjusting the sulphate content, the sulphate is precipitated with barium compounds in the form of barium sulphate. Although this process is technically simple and can be applied to any salt, it is nevertheless expensive. Accordingly, many other processes have been described and, generally, may be divided into two groups, namely those which are based solely on anhydrite as impurity which is known to dissolve relatively slowly, and those which can also be applied to other sulphate impurities, such as $MgSO_4$, $K_2SO_4$, polyhalite and the like.

Canadian Pat. No. 885,913 describes a process which utilises the difference in the dissolution rates of anhydrite and alkali metal chloride. Unfortunately, this process requires an elaborate apparatus for quickly dissolving finely ground salt and for subsequently separating off the substantially undissolved anhydrite.

Other processes use brine saturated with anhydrite from the outset, so that further dissolution is prevented. However, extremely careful monitoring is necessary to ensure that there is no uncontrolled precipitation of gypsum in the electrolysis cells which can seriously disrupt their operation.

In addition to the barium sulphate precipitation process, a process known as the calcium chloride/soda process is also universally applicable. In this process, gypsum or $CaSO_4.H_2O$ is precipitated with an excess of calcium chloride in a component stream, the filterable component stream is recombined with the main stream, and the entire calcium is precipitated in the form of calcium carbonate. This process requires the use of considerable quantities of calcium chloride unless the calcium precipitated in the form of calcium carbonate is reacted with hydrochloric acid to form calcium chloride and reused.

Conventional methods for the production of chlorine and alkali metal hydroxide by electrolysis by the amalgam process are seriously complicated by these necessary and, in some cases, elaborate process steps for purifying the brine. Moreover, in order to minimize these complications, these processes are confined to the use of salts with the lowest possible calcium and sulphate contents in order to keep the expense involved in purifying the brine within commercially and technically acceptable limits.

Accordingly, the present invention relates to a process for the production of chlorine and alkali metal hydroxide by electrolysis by the amalgam process using calcium- and/or sulphate-containing crude salt which obviates the difficulties referred to above.

The process according to the invention is distinguished by the fact that the calcium and sulphate contents introduced into the brine by the crude salt are removed from the brine by precipitation of the double salt $Na_2SO_4.CaSO_4$.

The invention is based on the surprising discovery that the long-known compound $Na_2SO_4.CaSO_4$, Which also occurs in nature as glauberite, is still stable under conditions which can be established in brines for electrolysis purposes. In cases where glauberite is present as the crystalline phase, the calcium content of the brine is even lower than in the case of gypsum and anhydrite for the same sulphate content. The process according to the invention is particularly advantageous in cases where a small calcium content is acceptable in the brine and where the salt being processed contains, in molar terms, more sulphate than calcium. This is always the case when, in addition to anhydrite, potassium sulphate, magnesium sulphate and/or polyhalite for example are present as impurities in the salt.

The process according to the invention is further distinguished by the fact that $Na_2SO_4.CaSO_4$ seed crystals are added to the crude brine for increasing the crystallisation rate. The seed crystals are preferably added in a quantity of from 0.1 to 1 g per liter of brine. The seeds preferably have an average crystallite size of from about 10 to 100 $\mu$.

The process is further distinguished by the fact that the glauberite crystals which are filtered off after precipitation may be reused as seeds, optionally after grinding.

For a molar ratio of the $SO_4$ content to the calcium content in the salt of greater than 2, the deficit of calcium ions can be corrected by the addition of calcium chloride for sulphate precipitation. The precipitated double salt $Na_2SO_4.CaSO_4$ may even advantageously be decomposed into $CaSO_4$ hydrate and the deficit of calcium ions corrected by adding the calcium sulphate hydrate thus obtained.

If the molar ratio of the impurities in the salt ($SO_4$ to Ca) is less than 2, the calcium excess may be precipitated in the form of calcium carbonate in the usual way by adding soda.

In laboratory tests, the solubility product of Ca and $SO_4$ ions in the presence of glauberite was measured at 2.4 $(g/l)^2$. By contrast, the solubility product of gypsum amounts to approximately 8.8 $(g/l)^2$ and the solubility product of anhydrite to aproximately 4.3 $(g/l)^2$. Accordingly, no gypsum can be precipitated in the electrolysis cells. Even in the event of incomplete glauberite precipitation, there is no deposition of glauberite because the solubility of glauberite increases with decreasing salt concentration.

In another embodiment of the process according to the invention, sulphate is initially precipitated by the addition of calcium chloride to a component stream of the brine circuit. Compared with the precipitation of gypsum, semihydrate or anhydrite, the major advantage in this case is the molar ratio of $SO_4$ to Ca of 2 : 1 in the $Na_2SO_4.CaSO_4$. As a result, the calcium chloride demand is at least halved by comparison with the calcium chloride/soda process. In addition, the excess of calcium chloride can be kept smaller because the solubility of glauberite is lower than that of gypsum. The calcium ions introduced into the component stream are precipitated in the form of calcium carbonate by the addition of soda after the component stream has been filtered and combined with the main stream.

The process according to the invention is illustrated by the following Examples.

EXAMPLE 1

A depleted brine containing 280 g/l of NaCl, 30 g/l of $SO_4$ and 1120 mg/l of Ca is strengthened with 30 g/l of salt. The salt contains 1 % of sulphate of which half is present as angydrite and the other half as polyhalite. After the salt has been dissolved, approximately 200 mg/l of anhydrite can be separated off. In other words, the anhydrite had remained largely undissolved under these conditions. The brine contains 30.15 g/l of $SO_4$ and 150 mg/l of Ca. After the addition of glauberite seeds and a residence time of 1 hour at 75° C. the brine is restored to its original composition in terms of Ca and $SO_4$. The deposit consists of well-crystallised rhombi. It can be easly identified under a microscope. X-ray analysis confirms that it is glauberite.

Although the solubility product in the presence of gluaberite was not reached during this precipitation, it is nevertheless lower than in the presence of anhydrite.

If it is desired to produce a brine substantially free from calcium (precipitation with excess soda), the sulphate is removed by glauberite precipitation, preferably in a small not be directly used for the sulphate precipitation. Example 2 describes a procedure typical of this embodiment.

EXAMPLE 2

The depleted brine only contains 4 mg/l of Ca. The other conditions remain the same. Approximately 50 % of the anhydrite dissolves, the rest being separated off. The brine now contains 30.2 g/l of $SO_4$ and 65 mg/l of Ca. 5 % of the brine circuit is branched off as a component stream to which 2.6 g/l of $CaCl_2$ are added. The sulphate level drops to 25.8 g/l with precipitation of glauberite. Sufficiently long residence times may readily be adjusted for the small component stream and/or precipitation may be accelerated by the addition of seeds. The glauberite is filtered off (~6 g/l), the solution is combined with the main stream, precipitated with soda and NaOH, filtered and used for electrolysis.

EXAMPLE 3

The procedure is as described in Example 2, except that the undissolved anhydrite is not isolated. Accordingly, it is solubilised during purification of the brine. As a result, the $CaCl_2$ demand increases to 3.4 g/l.

Expressed as salt, this amounts to approximately 5.6 kg of $CaCl_2$/t of salt. In the calcium chloride/soda process where $CaSO_4$ hydrate is precipitated, the $CaCl_2$ demand amounts to approximately 14 kg/t of salt. In this embodiment too, the process according to the invention is distinctly superior.

The glauberite precipitated decomposes into hydrated calcium sulphate when the mother liquor adhering to it is diluted. The sodium sulphate can be washed out and the residue can be reused for glauberite precipitation, as shown in Example 4.

EXAMPLE 4

1 g of $CaSO_4$ hydrate from glauberite is added to a depleted brine containing 280 g/l of NaCl and 25 g/l of $SO_4$. After a residence time of 1 hour at 75° C., only glauberite can be detected in the solid phase under a microscope. Standard building gypsum or waste gypsum from other chemical processes is equally suitable.

The reactionvelocity is not significantly lower than in precipitation with $CaCl_2$, in addition to which $CaSO_4$ hydrate can be precipitated as an intermediate stage. Accordingly, the precipitant can be recirculated much more easily than in the classic calcium chloride/soda process.

What is claimed is:

1. A process for the production of chlorine and alkali metal hydroxide by electrolysis by the amalgam process using calcium- and/or sulphate-containing crude salt, wherein the calcium and sulphate contents introduced into the brine circuit by the crude salt are removed from the brine by precipitation of the double salt $Na_2SO_4.CaSO_4$.

2. A process as claimed in claim 1, wherein precipitation is accelerated by the addition of $Na_2SO_4.CaSO_4$-seeds.

3. A process as claimed in claim 2, wherein the $Na_2S0_4.CaSO_4$ seeds have a particle size of from 10 to 100 $\mu$.

4. A process as claimed in claim 2, wherein the seeds are used in quantities of from about 0.1 to 1 g/l of brine.

5. A process as claimed in claim 2, wherein the precipitated $Na_2SO_4$ is ground and reused as seed for precipitation.

6. A process as claimed in claim 1, wherein the calcium content of the crude brine is adjusted before precipitation by the addition of calcium ions.

7. A process as claimed in claim 6, wherein the double salt $Na_2SO_4.CaSO_4$ obtained by precipitation is decomposed in to $CaSO_4$ hydrate after separation and is used for adjusting the calcium content in the crude brine.

8. A process as claimed in claim 1, wherein precipitation is carried out by the addition of calcium chloride and/or sulphate to a brine component stream and the calcium ions introduced in excess are precipitated in the form of calcium carbonate after the component stream has been combined with the main stream.

* * * * *